J. H. HILLIARD.
ANTISKID DEVICE FOR VEHICLE WHEELS.
APPLICATION FILED DEC. 16, 1919.

1,404,524.

Patented Jan. 24, 1922.
2 SHEETS—SHEET 1.

John H. Hilliard
INVENTOR

BY
Frederick S. Duncan
ATTORNEY

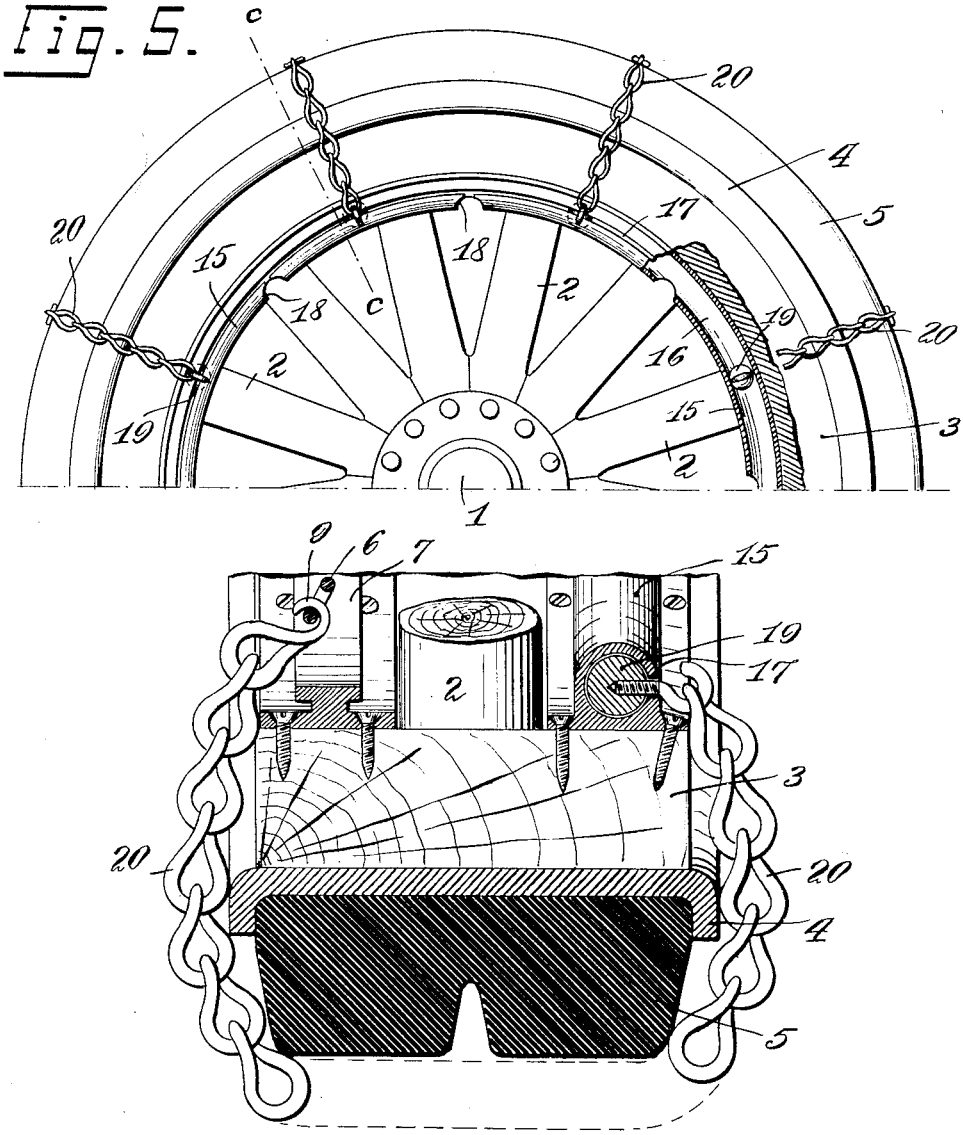

UNITED STATES PATENT OFFICE.

JOHN H. HILLIARD, OF NEW YORK, N. Y., ASSIGNOR TO AMERICAN CHAIN COMPANY, INC., A CORPORATION OF NEW YORK.

ANTISKID DEVICE FOR VEHICLE WHEELS.

1,404,524.  Specification of Letters Patent.  Patented Jan. 24, 1922.

Application filed December 16, 1919. Serial No. 345,200.

*To all whom it may concern:*

Be it known that I, JOHN H. HILLIARD, residing in the city of New York, State of New York, and a citizen of the United States, have invented certain new and useful Improvements in Antiskid Devices for Vehicle Wheels, of which the following, taken in connection with the accompanying drawing, is a specification.

One object of my invention is to provide for vehicle wheels an anti-skid device of the type wherein any one or more of the tread members may be attached or detached independently of each other, and which is characterized by adaptability in the tread members, regardless of the number thereof attached, of continuously creeping about the periphery of the tire, as the wheel to which the device is attached passes over the tread surface.

A further object of my invention is to provide an anti-skid device of the type characterized by a continuous creeping action of the tread members, wherein the number of tread members that may be attached at one time shall be at the option of the user, the device nevertheless remaining fully operative to the extent of the number attached.

A further object is to provide an anti-skid device characterized by a creeping action, wherein one or more of the tread members may be attached and detached as desired, and in which the tread members are so connected that a substantial degree of resiliency may exist whereby sudden shocks and excessive strains incident to the drag caused by the wheel passing over the tread members are to a large extent avoided.

A further object is to provide a device wherein the tread members, although adapted to creep, are detachable, and are anchored to chains or other flexible anchoring elements.

A further object is to provide a device whereby individually detachable tread members, although adapted to creep, may be tightened about the tire.

Inasmuch as I have found that anti-skid devices having the characteristics above mentioned, have a special utility in conjunction with trucks as distinguished from lighter high-speed vehicles, I have shown my device structurally adapted for attachment to and use with a type of wheel commonly used with vehicles of the first mentioned type. I do not, however, intend to be understood as thereby implying that the scope of my invention is limited to such specific application or embodiment.

Figure 1:
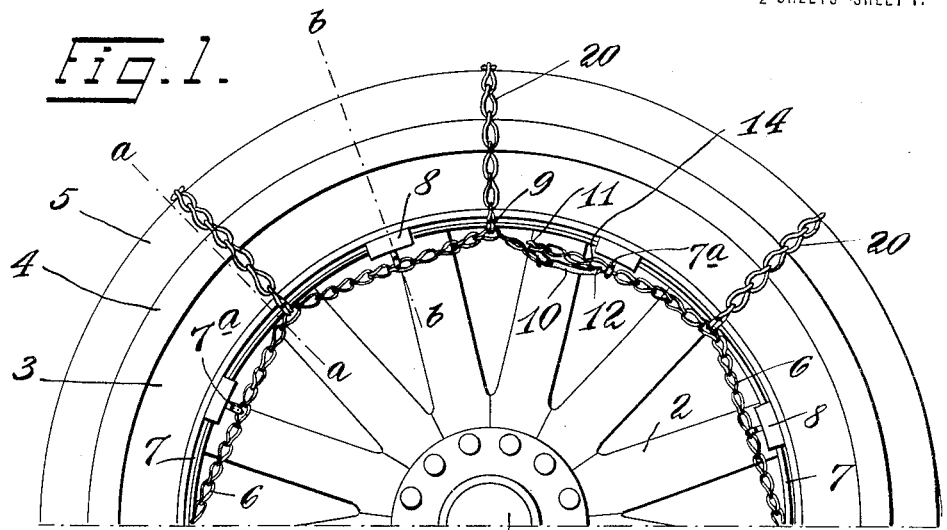
Figure 2:
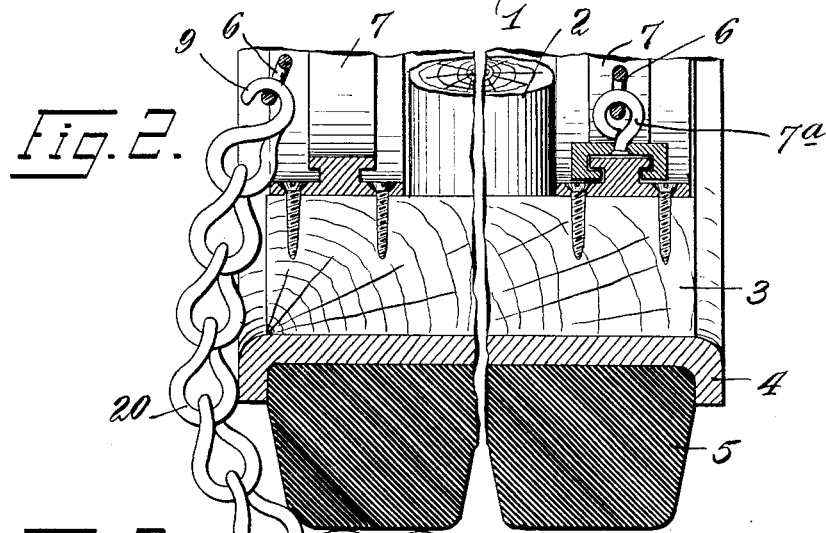
Figure 3:
Figure 4:
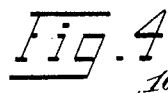

Referring to the drawings, Figure 1 is a side view of a one hundred and eighty degree segment of an automobile truck wheel with the corresponding segment of one form of my device attached, Figure 2 comprises two enlarged views in partial cross-section of Figure 1 on the lines $a, a$ and $b, b$ of the same, Figure 3 is a detail view of the guide and a rider connected thereto, Figure 4 is a detail view of the tightening and connecting means, Figure 5 is a side view of a one hundred and eighty degree segment of an automobile truck wheel showing a modification of my device, and Figure 6 is a cross section view of the modification of Figure 5 on the line $c-c$ of the latter.

The device may be used in conjunction with an ordinary type of truck wheel comprising, besides the usual hub 1 and spokes 2, the felly 3, rim 4 and tire 5. To serve as an anchoring element for the tread members for at least one side of the wheel, I employ a flexible member 6, consisting for example of chain which, in operative connection, is annularly arranged as shown. In the preferred form of my device, I employ two such flexible members, one on each side of the wheel with the spokes intervening as shown in Figure 2.

As it is desired that the tread members be adapted to creep about the tire, and as it is also desired that the anchoring elements be adapted to remain connected with the wheel at all times, whether or not in conjunction with tread members, I employ suitable means for retaining the anchoring elements to the wheel, which at the same time permit them to rotate freely, when properly actuated, in a circular path approximately concentric with the wheel. These means may consist of any suitable form of annular guide such as the continuous rail 7, on which the riders 8 are slidably fitted whereby they are free to travel continuously on the rail when properly actuated.

The riders are connected to the anchoring element at suitable intervals thereon whereby stress on any section of the anchoring element tangential of the guide may draw a rider at the end of said section along the said guide. For a truck wheel of ordinary size I have found that eight such riders suffice for most purposes, but I do not wish to be understood as confining myself to any specific number. Connections between the anchoring element and the rider may be established by any convenient means, such for example, as the eye bolts 7ª.

As partly explained above, the combination of annular anchoring element, guide and riders, thus for described, is preferably located on each side of the wheel. When it is desired to attach a tread member, the same is connected by any convenient means such as the hooks 9, at some point in the anchoring element on one side of the wheel, thence carried about the tire, and attached to a corresponding point on the opposite anchoring element. The tread members which may consist of sections of chain 20 are thus adapted to travel at spaced intervals about the periphery of the tire. It is not essential that the attaching joints for the tread members be precisely or even approximately midway between the riders, although I believe that greater resiliency may be obtained if such be the case.

The operation of detaching, and to a considerable extent, the operation of attaching a tread member or members, are liable to result in slack in the anchoring elements which makes it desirable to provide means for taking up the slack. Aside from taking up the possible slack developed by the operations of attaching and detaching tread members, the means referred to likewise make it possible to adjust the tension of the tread members on the tire within certain limits, in the same manner as in the well-known Weed type of anti-skid chain, and may serve as tightening means for the anchoring element when no tread members are attached. Suitable means for these purposes may comprise a lever 10, pivotally connected at an intermediate point thereof to a free end of the anchoring element, one end of the lever being provided with a hook 11 and the other end with a hook 12. When the free ends of the anchoring element have been drawn toward each other as far as may conveniently be done by direct pull, the hook 11 is engaged with a link at or near the end of the circular chain, the lever is swung on its pivot 13, and the hook 12 may be caused to engage with another link 14 of the chain, in a manner already well known.

In the modified form of my device shown in Figure 3, I make use of the spacing means and flexible anchoring element, as heretofore described, on one side only of the wheel. For the other side I provide any suitable form of guide for the opposite ends of the tread members, but make no provision for maintaining the said opposite ends at spaced intervals except in so far as this result is accomplished by the spacing on the annular anchoring element. A suitable construction may consist of the circular guide 15, provided with a continuous channel 16 and with a continuous slot 17. At intervals in the inner periphery on the guide apertures 18 may be provided of sufficient size to permit the insertion of the balls or enlarged members 19, with one of which each tread member terminates. The balls may therefore travel continuously in the channel, being spaced approximately at fixed intervals, the intervals being determined by the spacing on the circular anchoring element.

It is obvious that in the practice of my invention, modifications in detail may be followed and produced. I do not therefore wish to be limited to the details above set forth, but what I wish to secure is set forth in the following claims:

1. In an anti-skid device for vehicle wheels, two flexible tread member anchoring elements adapted to be disposed in annular arrangement, and two annular guides adapted for attachment to a vehicle wheel concentrically therewith, said anchoring elements being slidably connected with said guides.

2. In an anti-skid device for vehicle wheels, two flexible tread member anchoring elements adapted to be disposed in annular arrangement, and two annular guides, said anchoring elements being slidably connected at intervals with said guides.

3. In an anti-skid device for vehicle wheels, a flexible tread member anchoring element adapted to be disposed in annular arrangement, and connecting means attached to said anchoring element at intervals thereon whereby said anchoring element is adapted for slidable and rotatable connection with an annular guide.

4. In an anti-skid device for vehicle wheels a flexible ring on one side of the wheel, an annular guide on said side, said ring being slidably connected at intervals with said guide, and means on the opposite side of the wheel whereby the ends of tread members connected therewith are free to shift their positions in a path concentric with the wheel.

5. In an anti-skid device for vehicle wheels a flexible tread member anchoring element adapted to be disposed in annular arrangement, a continuous annular guide for said anchoring element, said element being slidably connected at intervals with said guide, and a second continuous annular guide adapted for slidable cooperation with the end of a tread member, said anchoring element being provided with means for adjusting its length.

6. An anti-skid device for vehicle wheels comprising two annular rails adapted for attachment to the inner periphery of a wheel, one on each side of the spokes, two anchoring elements of chain each provided with spaced riders adapted for slidable connection with one of said guides, and a plurality of tread members adapted to be connected with said anchoring element at points thereon intermediate said riders.

7. An anti-skid device for vehicle wheels comprising two annular rails adapted for attachment to the inner periphery of a wheel, one on each side of the spokes, two anchoring elements of chain each provided with spaced riders adapted for slidable connection with one of said guides, and a plurality of tread members adapted to be connected with said anchoring element at points thereon intermediate said riders, said anchoring elements being provided with means for taking up slack therein.

In testimony whereof, I have signed this specification.

JOHN H. HILLIARD.